(12) United States Patent
Sobue et al.

(10) Patent No.: US 9,956,858 B2
(45) Date of Patent: May 1, 2018

(54) DOOR WEATHER STRIP FOR VEHICLE

(71) Applicant: TOYODA GOSEI CO., LTD., Kiyosu-shi, Aichi-ken (JP)

(72) Inventors: Hiroshi Sobue, Kiyosu (JP); Tomohiro Dosaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days. days.

(21) Appl. No.: 15/455,585

(22) Filed: Mar. 10, 2017

(65) Prior Publication Data

US 2017/0274750 A1 Sep. 28, 2017

(30) Foreign Application Priority Data

Mar. 22, 2016 (JP) .................. 2016-056446

(51) Int. Cl.
*B60J 10/86* (2016.01)
*F16J 15/02* (2006.01)
*B60J 10/36* (2016.01)

(52) U.S. Cl.
CPC .............. *B60J 10/86* (2016.02); *B60J 10/36* (2016.02); *F16J 15/025* (2013.01); *F16J 15/027* (2013.01)

(58) Field of Classification Search
CPC .......... F16J 15/02; F16J 15/021; F16J 15/022; F16J 15/024; F16J 15/025; F16J 15/027; B60J 10/36; B60J 10/86
See application file for complete search history.

(56) References Cited

U.S. PATENT DOCUMENTS

| 6,386,619 | B1* | 5/2002 | Tsuchida | B60J 10/30 296/146.9 |
| 7,992,875 | B2* | 8/2011 | Kubo | B25B 31/00 277/630 |
| 2004/0079032 | A1* | 4/2004 | Russell | F16J 15/027 49/498.1 |
| 2005/0179217 | A1* | 8/2005 | Kuzuya | B60J 10/90 277/644 |
| 2009/0000206 | A1 | 1/2009 | Okajima et al. | |
| 2009/0079141 | A1* | 3/2009 | Qiang | F16J 15/027 277/650 |

FOREIGN PATENT DOCUMENTS

JP 2009-12490 A 1/2009
JP 5814811 B2 11/2015

* cited by examiner

*Primary Examiner* — Gilbert Y Lee
(74) *Attorney, Agent, or Firm* — Posz Law Group, PLC

(57) ABSTRACT

A door weather strip includes an attaching base, wherein: the attaching base has a bottom side part having a plate-like shape and facing the outer circumference of the door; core removal slits are formed at a main wall of a seal lip part of a die molding part; two core removal slits are provided at the bottom side part of the attaching base, and is provided such that the core removal slits of the attaching base are located at opposite sides of the core removal slits of the hollow seal part; and one of the core removal slits of the hollow seal part is open in a direction parallel to the bottom side part of the attaching base, and the other of the core removal slits of the attaching base is open in a direction perpendicular to the bottom side part of the attaching base.

15 Claims, 9 Drawing Sheets

DOOR WEATHER STRIP FOR VEHICLE

CROSS-REFERENCE TO RELATED APPLICATION(S)

This application is based upon and claims the benefit of priority from Japanese Patent Application No. 2016-056446, filed on Mar. 22, 2016, the entire contents of which are incorporated herein by reference.

BACKGROUND

1. Field of the Invention

The present invention relates to a door weather strip for a vehicle which seals a space between a vehicle door and a periphery of a vehicle body opening.

2. Description of the Related Art

As illustrated FIG. 9, a seal between a vehicle door and a periphery of a vehicle body opening is made by a door weather strip 110 attached to an outer circumference of a door frame 2 or the like and/or an opening trim weather strip (not illustrated) attached to a flange of the periphery of the vehicle body opening. A seal between a door glass 5 and a door is made by a glass run (not illustrated) attached to a channel of an inner circumference of the door frame 2.

As illustrated in FIG. 11, the door weather strip 110, which is attached to the outer circumference of the door frame 2 of the door and an outer circumference of a door panel 1 of the door, is made up of an attaching base 111 and a seal part integrally formed at an upper portion of the attaching base 111. The seal part is made up of a hollow seal part 114 and a seal lip part 116. The attaching base 111 is fitted into a retainer 155 attached to the outer circumference of the door frame 2, and is fixed to the door frame 2. On this occasion, the seal lip part 116 is in contact with a tip portion of of the periphery of the vehicle body opening at a vehicle outermost side, and seals a space between the periphery of the vehicle body opening and the door frame 2. At this point, the hollow seal part 114 is in contact with a bulge portion of the periphery of the vehicle body opening at a vehicle inner side relative to the portion with which the seal lip part 116 is in contact, and doubly seals the space between the door frame 2 and the periphery of the vehicle body opening.

The door weather strip 110 may be changed in sectional shape by its portion mounted on the door frame 2 and its portion mounted on the door panel 1. For this reason, as illustrated in FIG. 8, the door weather strip 110 is joined in the vicinity of a joined portion of the door panel 1 with the door frame 2 by a connecting part 115 formed by die molding. The door weather strip 110 is also connected at corner parts of the door frame 2 by corner parts 112 formed by die molding for bending the corner parts.

However, in a door weather strip 210 of a die molding part, to mold a hollow part in a hollow seal part 230, there is a need to provide a core in a metal mold and to extract the core from a core removal slit 224 of an attaching base 220 of the die molding part after molding (for example, see Japanese Unexamined Patent Application Publication No. 2009-12490). To extract this core, there are many portions where a die molded portion is undercut, and time is required by manual work. In addition, a rubber is also easily broken.

For this reason, as illustrated in FIGS. 13 and 14, at a corner part 312 by which extrusion molding parts 311 of a door weather strip 310 are connected to each other, an opening 321 is provided by removing an approximate middle portion of an attaching base 320, and is reinforced by reinforcement ribs 322 (for example, see Japanese Patent No. 5814811). However, since a hollow seal part that is a main seal is used as a tongue-like seal lip 340, sealability is not sufficient.

SUMMARY

An object of the present invention is to provide a door weather strip for a vehicle in which a core is easily separated in molding a corner part and which has excellent sealability.

According to an aspect of the present invention, there is provided a door weather strip for a vehicle which is attached to an outer circumference of a door of the vehicle and seals a space between a vehicle body opening and the door of the vehicle, the door weather strip including: an extrusion molding part; and a die molding part that connects ends of the extrusion molding part to each other, wherein: each of the extrusion molding part and the die molding part has an attaching base attached to the outer circumference of the door, a hollow seal part that is integrally formed at the attaching base and is in contact with and seals a periphery of the vehicle body opening, and a seal lip part that is integrally formed at the hollow seal part or the attaching base and is in contact with the periphery of the vehicle body opening; the attaching base has a bottom side part having a plate-like shape and facing the outer circumference of the door; core removal slits of the hollow seal part, which reach a hollow part of the hollow seal part, are formed at a main wall of the seal lip part of the die molding part; two core removal slits of the attaching base reaching the hollow part of the hollow seal part are provided at the bottom side part of the attaching base of the die molding part, and is provided such that the core removal slits of the attaching base are located at opposite sides of the core removal slits of the hollow seal part; and one of the core removal slits of the hollow seal part is open in a direction parallel to the bottom side part of the attaching base, and the other of the core removal slits of the attaching base is open in a direction perpendicular to the bottom side part of the attaching base.

According to the aspect of the present invention, in the door weather strip which is attached to the outer circumference of the door of the vehicle and seals the space between the vehicle body opening and the door of the vehicle, the door weather strip is formed from the extrusion molding part, and the die molding part that connects the ends of the extrusion molding part to each other. For this reason, the extrusion molding part can be rapidly molded by extrusion molding, and the extrusion molding parts are connected to each other by the die molding part, and are molded according to a shape of a corner of the door.

Each of the extrusion molding part and the die molding part has the attaching base attached to the outer circumference of the door, the hollow seal part that is integrally formed at the attaching base and is in contact with and seals the periphery of the vehicle body opening, and the seal lip part that is integrally formed at the hollow seal part or the attaching base and is in contact with the periphery of the vehicle body opening. For this reason, when the attaching base is attached to the outer circumference of the door, the hollow seal part and the seal lip part can be in contact with and seal the periphery of the vehicle body opening. Since the attaching base has the plate-like bottom side part of the attaching base facing the outer circumference of the door, an attaching surface of the door and the bottom side part of the attaching base are closely attached, and the attaching base can be stably attached.

The core removal slits of the hollow seal part, which reach the hollow part of the hollow seal part, are formed at the main wall of the seal lip part of the die molding part. For this reason, cores for forming the hollow seal part of the die molding part can be extracted from the core removal slits of the hollow seal part.

Since the core removal slits of the attaching base are located at the opposite sides of the core removal slits of the hollow seal part, the die molding part can be formed by three cores. Each of the cores can be made small, and also be extracted without excessiveness. The hollow seal part is not broken.

One of the core removal slits of the hollow seal part is open in the direction parallel to the bottom side part of the attaching base, and the other of the core removal slits of the attaching base is open in the direction perpendicular to the bottom side pail of the attaching base. For this reason, after the cores are extracted from the core removal slits of the hollow seal part, the cores can be extracted from the core removal slits of the attaching base in another direction, and are easily extracted. Directions in which the cores are extracted are different, and there is no contact when the cores are extracted.

The door weather strip of the present invention may further includes a plurality of biasing ribs of the hollow seal part, running from a vicinity of a tip of the main wall of the seal lip part of the core removal slits of the hollow seal part in a direction of the bottom side part of the attaching base.

According to the present invention, the plurality of biasing ribs of the hollow seal part running from the vicinity of the tip of the main wall of the seal lip part of the core removal slits of the hollow seal part in the direction of the bottom side part of the attaching base are formed. For this reason, even when the core removal slits of the hollow seal part are formed at intervals as openings, the bottom side part of the attaching base is pressed such that the biasing ribs of the hollow seal part couple the intervals of the openings when the door is closed. The bottom side part of the attaching base is pressed against the attaching surface of the door frame, and sealability between the attaching base and the attaching surface of the door frame can be improved.

In the door weather strip of the present invention, an interval between the biasing ribs of the hollow seal part may range from 2 mm to 7 mm.

According to the present invention, since the interval between the biasing ribs of the hollow seal part ranges from 2 mm to 7 mm, the biasing ribs of the hollow seal part reliably press a wide range of the bottom side part of the attaching base, and can improve seal ability of a wide range between the attaching base and the attaching surface of the door frame. When the interval is less than 2 mm, the biasing ribs of the hollow seal part become an obstacle when the cores are extracted from the core removal slits of the hollow seal part. When the interval exceeds 7 mm, a force by which the biasing ribs of the hollow seal part press the bottom side part of the attaching base is weakened, and the sealability between the attaching base and the attaching surface of the door frame becomes insufficient.

In the door weather strip of the present invention, the biasing ribs of the hollow seal part may be formed to be in contact with an upper surface of the bottom side part of the attaching base, and be in contact with an upper surface of a vehicle inside relative to a lateral end of a vehicle outside of the upper surface of the bottom side part of the attaching base.

According to the present invention, the biasing ribs of the hollow seal part are formed to be in contact with the upper surface of the bottom side part of the attaching base, and are in contact with the upper surface of the vehicle inside relative to the lateral end of the vehicle outside of the upper surface of the bottom side part of the attaching base. For this reason, when the hollow seal part is in contact with the periphery of the vehicle body opening, and the biasing ribs of the hollow seal part are pressed against the upper surface of the bottom side part of the attaching base, although the biasing ribs of the hollow seal part are shifted, tips of the biasing ribs of the hollow seal part do not come off from the upper surface of the bottom side part of the attaching base. The tips of the biasing ribs of the hollow seal part can reliably press the upper surface of the bottom side part of the attaching base, and the sealability between the attaching base and the attaching surface of the door frame can be improved.

The door weather strip of the present invention may further includes a water cutoff wall of hollow seal part, located between the core removal slits of the hollow seal part and the hollow part of the hollow seal pail which is opened and between the core removal slits of the attaching base and the hollow part of the hollow seal part which is opened.

According to the present invention, the water cutoff wall of hollow seal part is formed between the core removal slits of the hollow seal part and the hollow part of the hollow seal part which is opened and between the core removal slits of the attaching base and the hollow part of the hollow seal part which is opened. For this reason, even when an interval between the cores for forming the core removal slits of the hollow seal part and the hollow part of the hollow seal part which is opened and an interval between the cores for forming the core removal slits of the attaching base and the hollow part of the hollow seal part which is opened are not managed with accuracy, a space for forming the water cutoff wall of hollow seal part absorbs a variation between the cores, the cores are not in contact with each other, and rigidity of the hollow seal part is improved by the water cutoff wall of hollow seal part.

The door weather strip of the present invention may further includes seal projections of the attaching base, continued in a longitudinal direction and located at opposite ends of an outer surface of the bottom side part of the attaching base.

According to the present invention, the seal projections of the attaching base continued in the longitudinal direction are formed at the opposite ends of the outer surface of the bottom side part of the attaching base. For this reason, the seal projections of the attaching base can be in contact with and seal the attaching surface of the door frame over a full length of the door frame such that rainwater or the like entering from a space between the attaching base and the outer circumference of the door does not enter the vehicle inside.

Since the core removal slits of the attaching base are provided to be located at the opposite sides of the core removal slits of the hollow seal part, the die molding part can be formed by three cores, and the cores can also be extracted without excessiveness. The hollow seal part is not broken.

Since the core removal slits of the hollow seal part are open in the direction parallel to the bottom side part of the attaching base, and the core removal slits of the attaching base are open in the direction perpendicular to the bottom side part of the attaching base, the cores are extracted from the core removal slits of the hollow seal part, and then can be extracted from the core removal slits of the attaching base. The cores are easily extracted.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
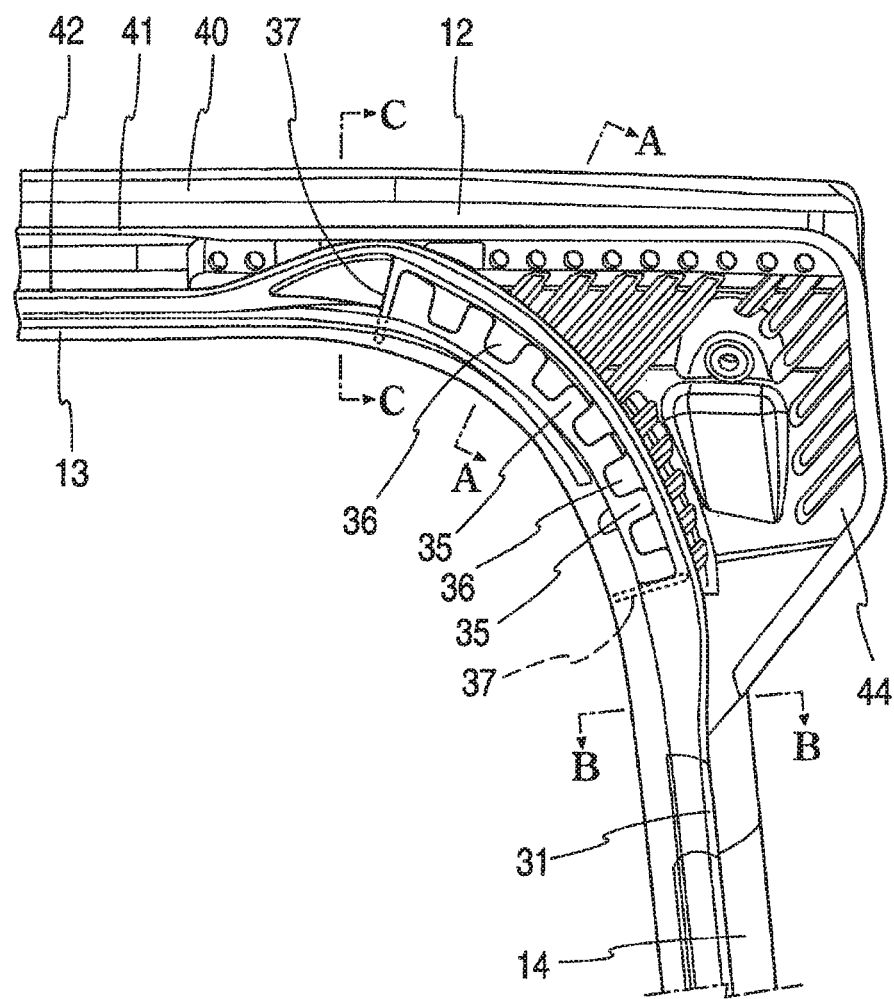
FIG. 1 is a rear view of a corner part of a door weather strip that is an embodiment of the present invention.
Figure 2:
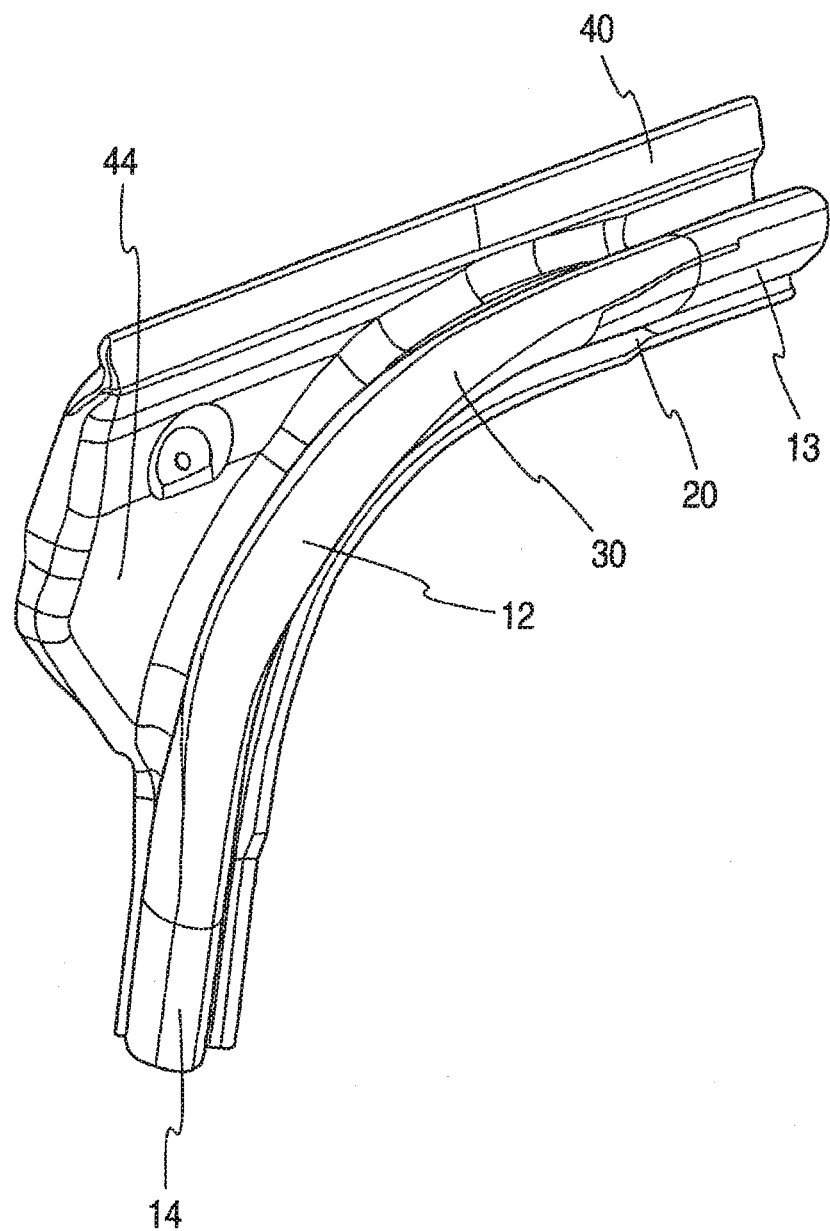
FIG. 2 is a front view of the corner part of the door weather strip that is the embodiment of the present invention.
Figure 3:
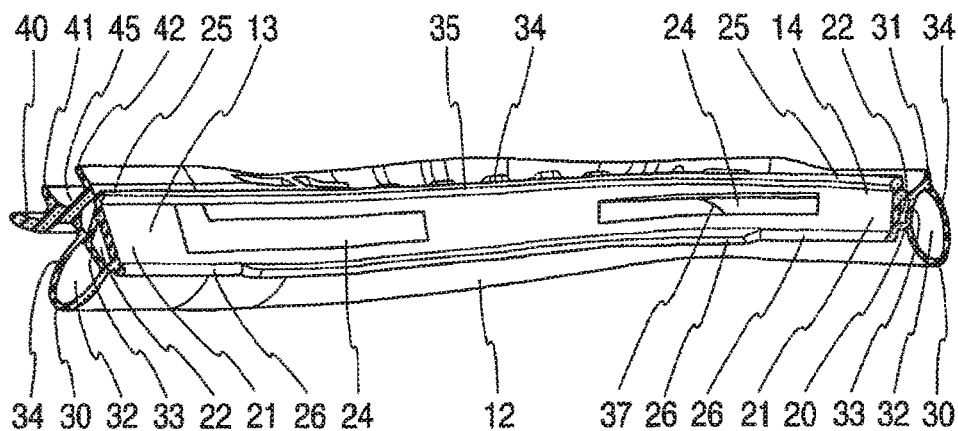
FIG. 3 is a bottom view of the corner part of the door weather strip that is the embodiment of the present invention.
Figure 5:
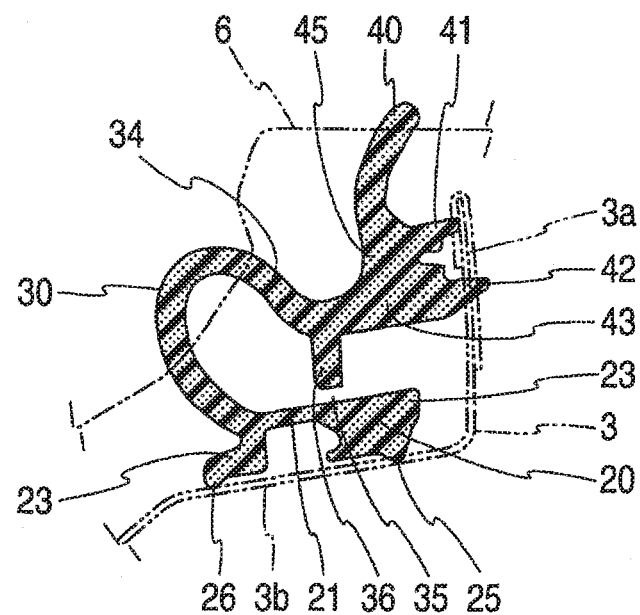
FIG. 5 is a sectional view of the corner part of the door weather strip that is the embodiment of the present invention, and is taken along line A-A of FIG. 1.
Figure 6:
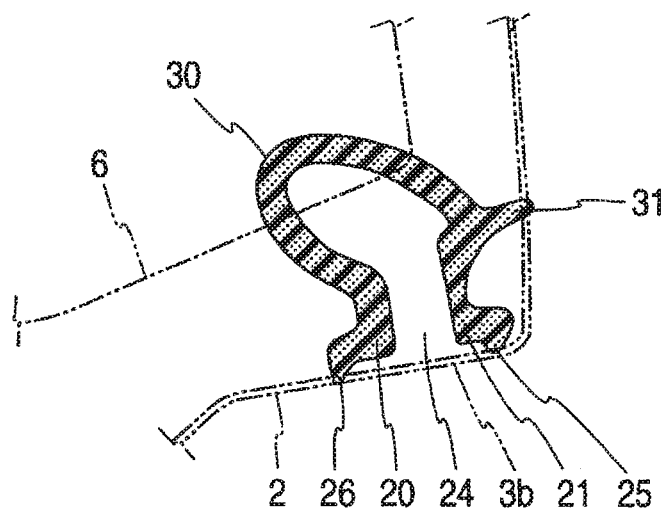
FIG. 6 is a sectional view of the corner part of the door weather strip that is the embodiment of the present invention, and is taken along line B-B of FIG. 1.
Figure 7:
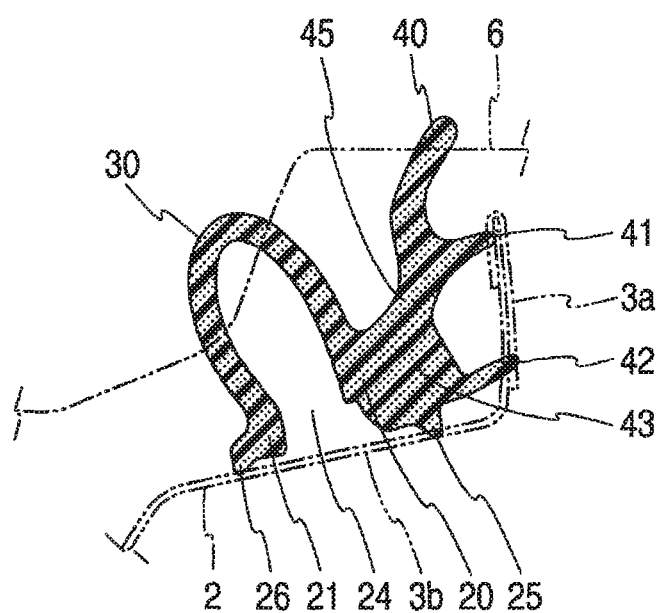
FIG. 7 is a sectional view of the corner part of the door weather strip that is the embodiment of the present invention, and is taken along line C-C of FIG. 1.
Figure 8:
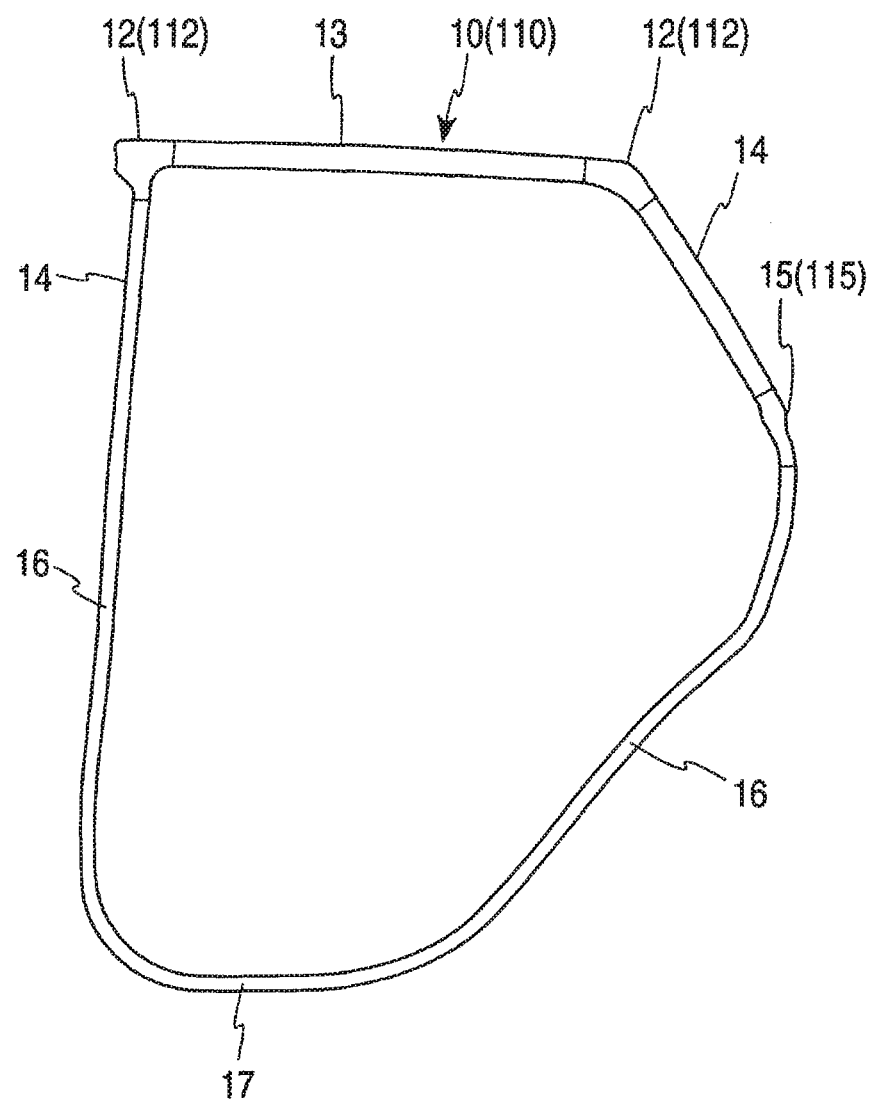
FIG. 8 is a front view of the door weather strip that is the embodiment of the present invention.
Figure 9:
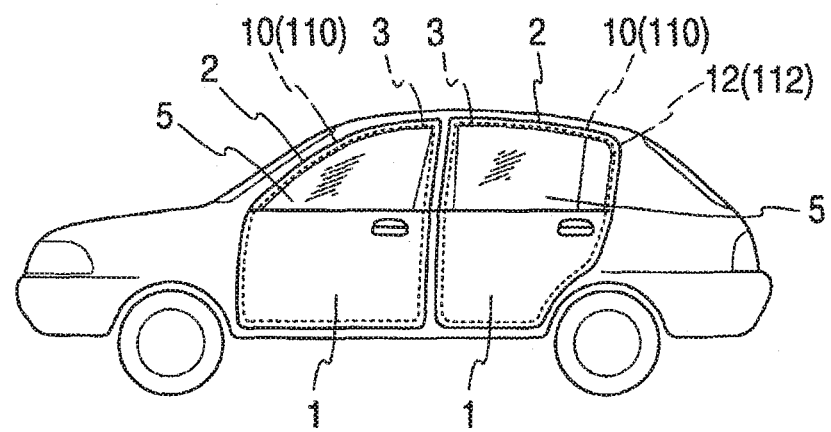
FIG. 9 is a side view of a vehicle.
Figure 10:
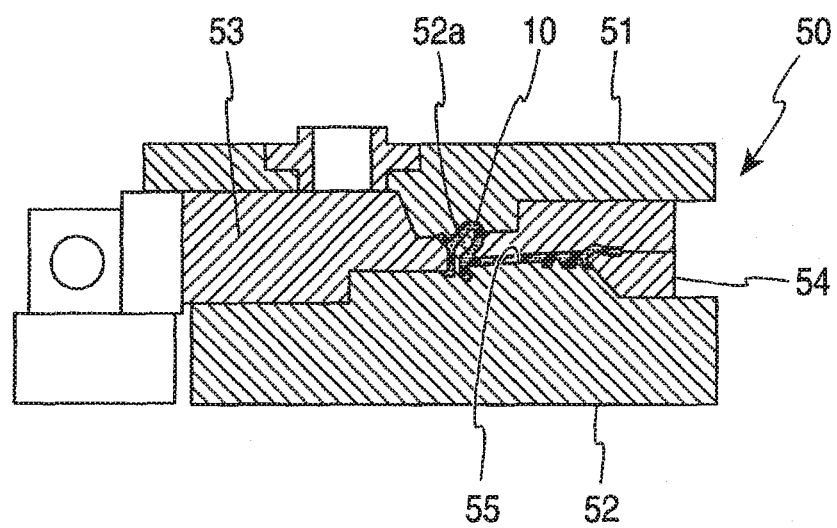
FIG. 10 is a sectional view of a metal mold for molding the corner part of the door weather strip that is the embodiment of the present invention, and illustrates a state in which the metal mold is closed.

Hereinafter, a door weather strip 10 of an embodiment of the present invention will be described based on FIGS. 1 to 9, and a method of molding a corner part of the door weather strip 10 of the embodiment of the present invention will be described based on FIG. 10. FIG. 9 is a side view of a vehicle on which the door weather strip 10 of the present invention is mounted. FIG. 8 is a front view of the entire door weather strip 10 mounted on a door panel 1 and a door frame 2. FIGS. 1 to 3 are rear, front, and bottom views of a corner part 12 which will be described below FIGS. 5 to 7 are sectional views taken along lines A-A to C-C of FIG. 1, respectively.

The door weather strip 10 is mounted on an outer circumference of a door made up of the door panel 1 and the door frame 2 of the vehicle. In the present embodiment, the door weather strip 10 mounted on a rear door will be described, but the present invention can be equally carried out on the door weather strip 10 mounted on a front door. A door glass 5 is raised and lowered inside the door frame 2. The door weather strip 10 is formed of an extrusion molding part formed by extrusion molding, and a die molding part formed by die molding and connecting ends of the extrusion molding part to each other.

As illustrated in FIG. 8, the extrusion molding part is made up of an upper side part 13 that is attached to an upper side of the door frame 2, vertical side upper parts 14 that are attached to vertical sides of front and rear sides of the door frame 2, vertical side lower parts 16 and 16 that are attached to vertical sides of front and rear sides of an outer circumference of the door panel 1, and a lower side part 17 that is attached to a lower side of the door panel 1. The lower side part 17 may also be extruded continuously and integrally with the vertical side lower parts 16 and 16. Only the vertical side lower parts 16 and 16 may be used without having the lower side part 17.

The extrusion molding part, in which the lower side part 17 is extruded continuously and integrally with the vertical side lower parts 16 and 16, is bent while being flexed along a shape of the outer circumference of the door panel 1. Since a corner part 12 has a smaller curvature than the door frame 2, and a sectional shape of the lower side part 17 is not complicated over that of the upper side part 13, the door panel 1 is neither folded nor bent more easily, and often has no connecting part formed by, particularly, die molding. However, the connecting part formed by die molding can be used, for example, when the curvature of the corner part 12 is increased.

The die molding part is made up of corner parts 12 and 12 that are attached to a corner and a joint part of the door frame 2 and connect the upper side part 13 and the vertical side upper part 14 to each other, and a vertical side connecting part 15 that connects the vertical side upper part 14 and the vertical side lower part 16 to each other in the vicinity of a joint between the door frame 2 and the door panel 1 at the rear side. As will be described below, the extrusion molding part and the die molding part have an attaching base 20 and a hollow seal part 30. However, in order to connect the extrusion molding parts having different sectional shapes to each other, a sectional shape of the die molding part is gradually changed from one tip to the other tip.

In the embodiment of the present invention, first, the description will be made by way of example with respect to the upper side part 13 and the vertical side upper part 14 of the door weather strip 10 of the rear door, and the corner part 12 which connects the upper side part 13 and the vertical side upper part 14 attached to the corners of the door frame 2 to each other. The connecting portion of the front side or the die molding part attached to the front door can also be considered in the same way. As illustrated in FIGS. 1 and 2, the connection portion between the upper side part 13 and the vertical side upper part 14 is formed as the corner part 12.

Shapes of the upper side part 13 and the vertical side upper part 14 will be described first, and the corner part 12 will be described below. As illustrated in a right section of FIG. 3, the vertical side upper part 14 is made up of the attaching base 20 that is attached to the door frame 2, and the hollow seal part 30 that is integrally formed from the attaching base 20 and is in contact with a periphery 6 of the vehicle body opening.

A hollow seal projection 31 that is in contact with the door panel 1 is formed at the hollow seal part 30. A space between the door panel 1 or the door frame 2 and the periphery 6 of the vehicle body opening can be sealed by the hollow seal part 30, and a space between the door panel 1 or the door frame 2 and the door weather strip 10 can be sealed by the hollow seal projection 31.

A bottom side of the attaching base 20 of the vertical side upper part 14 forms a plate-like bottom side part 21, and an out-of-vehicle seal projection 25 and an in-vehicle seal projection 26 are formed on lateral end faces of opposite sides thereof which are in contact with the door panel 1. The out-of-vehicle seal projection 25 and the in-vehicle seal projection 26 can seal a space between the door panel 1 and the attaching base 20.

A hollow part 22 is formed inside the attaching base 20 of the vertical side upper part 14 to be adjacent to the hollow seal part 30. For this reason, flexibility of the attaching base 20 is increased, and the door weather strip 10 is easy to bend along the door frame 2 or the door panel 1 and is further reduced in weight.

A hollow seal bridge part 33 is formed between the hollow seal part 30 and the hollow part 22, thereby enhancing rigidity of the hollow seal part 30, preventing abnormal deformation of the hollow seal part 30, and improving sealability of the hollow seal part 30. However, as will be described below, the hollow seal bridge part 33 is not formed at the attaching base 20 of the corner part 12 in order to extract the core.

Next, as illustrated in a left section of FIG. 3, the upper side part 13 is made up of the attaching base 20 that is attached to the door frame 2, and a seal lip part 40 that is integrally formed from the attaching base 20, is integrally formed from lateral ends of the hollow seal part 30 and the attaching base 20 that are in contact with the periphery 6 of the vehicle body opening, and is formed on a lateral surface of the hollow seal part 30.

The space between the door frame 1 or the door frame 2 and the periphery 6 of the vehicle body opening can be sealed by the hollow seal part 30. As illustrated in FIG. 7, the seal lip part 40 is configured such that a main wall 45 thereof runs from the attaching base 20 and a tip thereof is in contact with the periphery 6 of the vehicle body opening.

As illustrated in FIG. 7, the main wall 45 is formed with first and second seal lip projections 41 and 42 that are in contact with a door attaching part tip 3a of the door frame 2. The first and second seal lip projections 41 and 42 are in contact with the door attaching part tip 3a of the door frame 2, and the space between the door panel 1 or the door frame 2 and the door weather strip 10 can be sealed by the seal lip part 40.

Like the vertical side upper part 14, a bottom side of the attaching base 20 of the upper side part 13 forms a plate-like bottom side part 21, and an out-of-vehicle seal projection 25 and an in-vehicle seal projection 26 are formed on lateral end faces of opposite sides thereof which are in contact witty the door panel 1. The out-of-vehicle seal projection 25 and the in-vehicle seal projection 26 can seal a space between the door frame 2 and the attaching base 20. The out-of-vehicle seal projection 25 and the in-vehicle seal projection 26 are formed while being continued from the upper side part 13 to the vertical side upper part 14 via the corner part 12.

Like the vertical side upper part 14, the hollow part 22 is formed inside the attaching base 20 of the upper side part 13 to be adjacent to the hollow seal part 30. For this reason, the flexibility of the attaching base 20 is increased, and the door weather strip 10 is easy to bend along the door frame 2 or the door panel 1 and is further reduced in weight.

Like the vertical side upper part 14, a hollow seal bridge part 33 is formed between the hollow seal part 30 and the hollow part 22, thereby enhancing the rigidity of the hollow seal part 30, preventing the abnormal deformation of the hollow seal part 30, and improving the sealability of the hollow seal part 30. However, as will be described below, the hollow seal bridge part 33 is not formed at the attaching base 20 of the corner part 12 in order to extract the core.

Next, the corner part 12 will be described. As illustrated in FIGS. 1 to 3, the upper side part 13 and the vertical side upper part 14, which are molded by extrusion molding and have different sectional shapes, are connected by the corner part 12 that is the die molding part. As illustrated in FIG. 2, the corner part 12 is connected by a smooth surface to continue the attaching bases 20 and the hollow seal parts 30 of the upper side part 13 and the vertical side upper part 14 at an out-of-vehicle surface, and the corner part of the door frame 2 is covered by a cover part 44 continued from the seal lip part 40 of the upper side part 13.

The corner part 12 has the hollow seal part 30 formed by three cores. As illustrated in FIG. 3, two core removal slits 24 are formed at the bottom side part 21 of the attaching base 20. The cores for molding the hollow seal part 30 at a side approximating to the vertical side upper part 14 are extracted from the core removal slits 24 at the side approximating to the vertical side upper part 14, and the cores for molding the hollow seal part 30 at a side approximating to the upper side part 13 are extracted from the core removal slits 24 at the side approximating to the upper side part 13 (see FIGS. 3 and 5).

As illustrated in FIG. 1, the cores for molding the hollow seal part 30 at a middle portion of the corner part 12 are extracted from core removal slits 35 formed in the main wall 45 of the seal lip part 40. The core removal slits 35 and the core removal slits 24 will be described below.

As illustrated in FIG. 6, the corner part 12 is formed in a sectional shape similar to that of the vertical side upper part 14 at the side approximating to the vertical side upper part 14. That is, the corner part 12 is made up of the attaching base 20 that is attached to a attaching surface 3b of the door frame 2, and the hollow seal part 30 that is integrally formed from the attaching base 20 and is in contact with the periphery 6 of the vehicle body opening.

The hollow seal projection 31 that is in contact with the door panel 1 is formed at the hollow seal part 30. The bottom side of the attaching base 20 of the corner part 12 forms the plate-like bottom side part 21, and the out-of-vehicle seal projection 25 and the in-vehicle seal projection 26 are formed on the lateral end faces of the opposite sides thereof which are in contact with the door panel 1.

As described above, the out-of-vehicle seal projection 25 and the in-vehicle seal projection 26 of the corner part 12 are formed by being coupled with the out-of-vehicle seal projection 25 and the in-vehicle seal projection 26 formed at the attaching base 20 of the upper side part 13 and the vertical side upper part 14, and are continued from the upper side part 13 to the corner part 12 and the vertical side upper part 14 to be able to seal the space between the door frame 2 and the attaching base 20.

However, the core removal slits 24 communicating with the hollow part 22 and the hollow seal part 30 are formed in the bottom side part 21 of the attaching base 20. After the corner part 12 is molded, the cores for forming the hollow seal part 30 at the vertical side upper part 14 side of the corner part 12 (to be described below) be extracted from the core removal slits 24.

Next, as illustrated in FIG. 7, the corner part 12 is formed in a sectional shape similar to that of the upper side part 13 at the side approximating to the upper side part 13. That is, the corner part 12 is made up of the attaching base 20 that is attached to the door frame 2, the hollow seal part 30 that is integrally formed from the attaching base 20 and is in contact with the periphery 6 of the vehicle body opening, and the seal lip part 40.

The seal lip part 40 has the main wall 45 running from the attaching base 20, and a tip of the main wall 45 is in contact with the periphery 6 of the vehicle body opening when the door is closed, and seals the space between the periphery 6 of the vehicle body opening and the door weather strip 10. The main wall 45 is formed with first and second seal lip projections 41 and 42 that are in contact with the door attaching part tip 3a of the door frame 2. The first and second seal lip projections 41 and 42 are in contact with the door attaching part tip 3a of the door frame 2, and can seal the space between the door panel 1 or the door frame 2 and the door weather strip 10.

Like the vertical side upper part 14, the bottom side of the attaching base 20 of the upper side part 13 forms the plate-like bottom side part 21, and the out-of-vehicle seal projection 25 and the in-vehicle seal projection 26 are formed on the lateral end faces of the opposite sides thereof which are in contact with the door panel 1. The out-of-vehicle seal projection 25 and the in-vehicle seal projection 26 are attached in contact with the attaching surface 3b of the door frame 2.

The core removal slits 24 communicating with the hollow part 22 and the hollow seal part 30 are formed in the bottom side part 21 of the attaching base 20. After the corner part 12 is molded, the cores for forming the hollow seal part 30 at the upper side part 13 side of the corner part 12 (to be described below) can be extracted from the core removal slits 24.

Next, as illustrated in FIG. 5, the corner part 12 is formed in a sectional shape similar to that of the upper side part 13 in the vicinity of the center of the corner part 12. That is, the corner part 12 is made up of the attaching base 20 that is attached to the door frame 2, the hollow seal part 30 that is integrally formed from the attaching base 20 and is in contact with the periphery 6 of the vehicle body opening, and the seal lip part 40.

Like the upper side part 13, the tip of the main wall 45 is in contact with the periphery 6 of the vehicle body opening when the door is closed, and seals the space between the periphery 6 of the vehicle body opening and the door weather strip 10. The main wall 45 is formed with the first and second seal lip projections 41 and 42 that are in contact with the door attaching part tip 3a of the door frame 2. The first and second seal lip projections 41 and 42 are in contact with the door attaching part tip 3a of the door panel 1, and can seal the space between the door panel 1 or the door frame 2 and the door weather strip 10.

Like the vertical side upper part 14, the bottom side of the attaching base 20 of the upper side part 13 forms the plate-like bottom side part 21, and the out-of-vehicle seal projection 25 and the in-vehicle seal projection 26 are formed on the lateral end faces of the opposite sides thereof which are in contact with the attaching surface 3b of the door panel 1. A recess part corresponding to the hollow part 22 may be formed at a middle outer surface side of the bottom side part 21.

As described above, the core removal slits 35 are formed at a portion of the main wall 45 which is close to the attaching base 20. The cores for molding the hollow seal part 30 at the middle portion of the corner part 12 of the hollow seal part 30 are extracted from the core removal slits 35.

The core removal slits 35 are formed in the main wall 45, and the core removal slits 24 are formed in the bottom side part 21. However, the core removal slits 24 are provided to be located at opposite sides of the core removal slits 35. For this reason, the corner part 12, which is the die molding part, is formed by three cores, and these cores can be made small, and can be respectively extracted from three slits. The cores can also be extracted without excessiveness, and the hollow seal part is not broken.

The core removal slits 35 are open in a direction parallel to the bottom side part 21, and the core removal slits 24 are open in a direction perpendicular to the bottom side part 21. For this reason, after the cores are extracted from the core removal slits 35, the cores can be extracted from the core removal slits 24. The cores are extracted in different directions, and there is no contact when the cores are extracted.

A plurality of biasing ribs 36 are formed along a curve of the corner part 12 in a direction of the bottom side part 21 from the vicinities of openings of the core removal slits 35 which are close to the sidewall 34 of the hollow seal part. For this reason, as illustrated in FIG. 5, when the door is closed, the hollow seal part 30 is in contact with the periphery 6 of the vehicle body opening, and the biasing ribs 36 are in contact with the bottom side part 21, and can press the attaching base 20. The out-of-vehicle seal projection 25 and the in-vehicle seal projection 26 of the attaching base 20 are pressed against the attaching surface 3b of the door frame 2, and can improve sealability between the attaching base 20 and the attaching surface 3b.

An interval between the biasing ribs 36 preferably ranges from 2 to 7 mm. In this case, the plurality of biasing ribs 36 reliably press a wide range of the attaching base 20, and can improve sealability of a wide range between the attaching base 20 and the attaching surface 3b.

When the interval is less than 2 mm, the cores are low in die strength and are easily broken when the cores are extracted from the core removal slits 35. When the interval exceeds 7 mm, there occur a region having a strong force by which the biasing ribs 36 press the attaching base 20 and a region having a weak force, and sealiablity between the attaching base 20 and the attaching surface 3b is insufficient.

The biasing ribs 36 are preferably formed to be able to be in contact with an upper surface of the bottom side part 21, and are preferably in contact with an upper surface shifted to the vehicle inside from the lateral end of the vehicle outside of the upper surface of the bottom side part 21. In this case, when the hollow seal part 30 is in contact with the periphery 6 of the vehicle body opening, and the biasing ribs 36 are pressed against the upper surface of the bottom side part 21, although the biasing ribs 36 are shifted, tips of the biasing ribs 36 do not come off from the upper surface of the bottom side part 21. The tips of the biasing ribs 36 can reliably press the upper surface of the bottom side part 21, and the sealability between the attaching base 20 and the attaching surface 3b can be improved.

Figure 4:
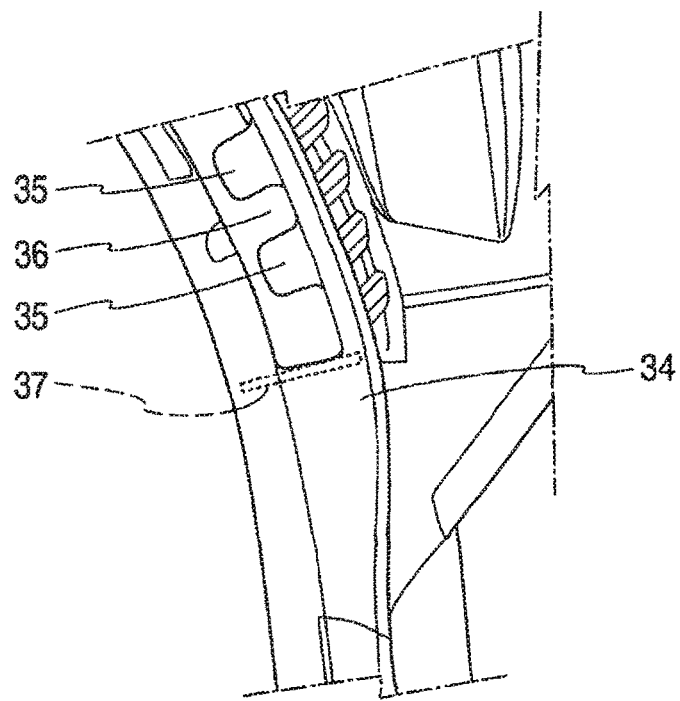
FIG. 4 is a partially enlarged view of a water cutoff wall portion of a hollow seal part in the rear view of the corner part of the door weather strip that is the embodiment of the present invention.

As illustrated in FIGS. 3 and 4, a water cutoff wall 37 is preferably formed between the core removal slits 35 and opposite ends of the hollow part 32 of hollow seal part which is opened and between the core removal slits 24 and the hollow part 32.

In this case, even when an interval between the cores for forming the core removal slits 35 and the hollow part 32 and an interval between the cores for forming the core removal slits 24 and the hollow part 32 are not managed with accuracy, the water cutoff wall 37 becomes a buffer portion, the cores are not in contact with each other, and rigidity of the hollow seal part 30 is improved by the water cutoff wall 37.

The water cutoff wall 37 is preferably formed to intersect a longitudinal direction of the hollow seal part 30. In this case, a variation in the interval between the cores can be absorbed, and damage of the cores can be prevented. The water cutoff wall 37 may be formed to be perpendicular to the longitudinal direction or to be inclined with respect to the longitudinal direction.

Figure 11:
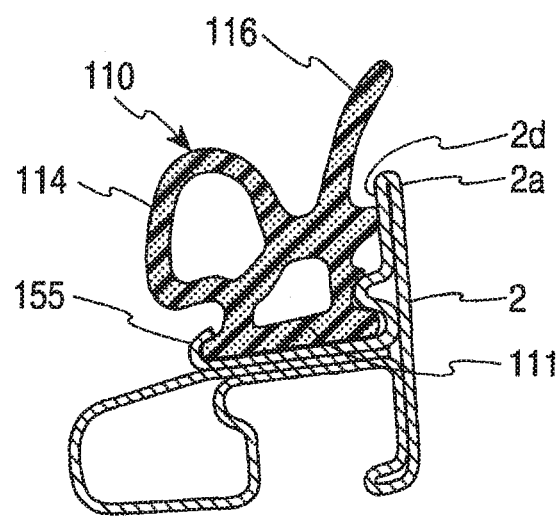
FIG. 11 is a sectional view in a state in which a conventional door weather strip is attached to an upper side of a door frame of a vehicle.
Figure 12:
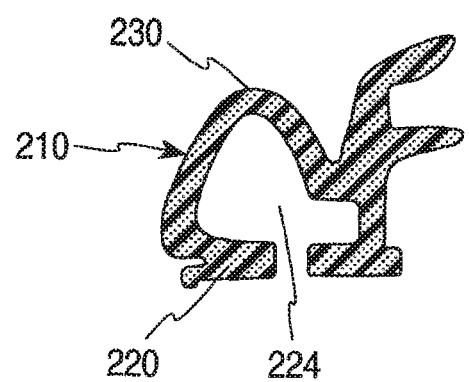
FIG. 12 is a sectional view of a corner part of another conventional door weather strip.
Figure 13:
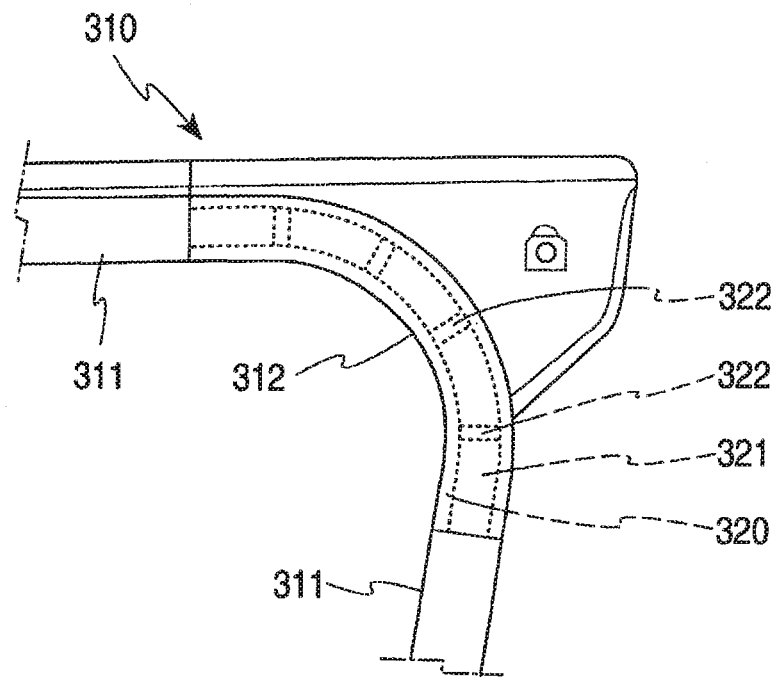
FIG. 13 is a front view of the corner part of the other conventional door weather strip.
Figure 14:
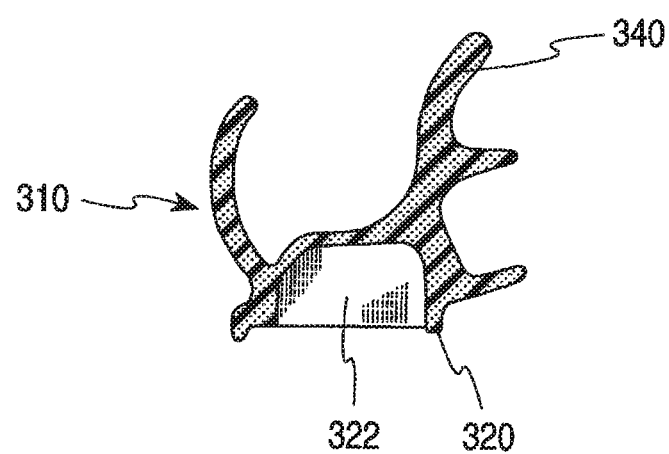
FIG. 14 is a sectional view of the corner part of the other conventional door weather strip.

Next, a method of molding the door weather strip 10 and the corner part 12 will be described based on FIGS. 10 to 12. In the door weather strips 10 for a vehicle such as a door weather strip 10 of the front door, a door weather strip 10 of the rear door, a back door weather strip, and so on, manufacturing methods thereof are nearly the same, and the door weather strip 10 of the rear door will be described by way of example.

In molding the extrusion molding part of the door weather strip 10 attached to the door frame 2 and the door panel 1, the extrusion molding part is formed by extrusion molding using an extruder, and a synthetic rubber or a thermoplastic elastomer is used as a moding material. For example, in the case of the synthetic rubber, an EPDM rubber is used. In the case of the thermoplastic elastomer, a polyolefin thermoplastic elastomer is used. To improve flexibility, these materials are preferably foamed and used as sponge materials.

In the case of the synthetic rubber, it is carried to a vulcanizing tank after the extrusion molding, is heated and vulcanized by heated air or a high frequency, and is foamed. In the case of the thermoplastic elastomer or a soft synthetic resin, it is heated and foamed at the same time as the extrusion molding or after the extrusion molding, and is cooled and solidified. Afterwards, this material is cut at a given length, and an extrusion molding part is manufactured.

Next, moding of the corner part 12 will be described based on FIG. 10. The corner part 12 is molded by die molding, and the molding of the corner part 12 includes cutting the upper side part 13 and the vertical side upper part 14, which are manufactured by the foregoing, with given dimensions, interposing the cut ends thereof in a molding die 50 for moding the corner part 12, and injecting a sponge material or a solid material for forming the corner part 12 into a cavil 55 of the molding die 50 as illustrated in FIG. 10.

The cavity 55 of the molding die 50 is formed by an upper die 51, a lower die 52, a central core 53, and a middle plate 54 of the molding die 50. The corner part 12 has nearly the same sectional shape as the upper side part 13 and the vertical side upper part 14 at the tip sides thereof. The molding material preferably uses the same type as the materials used for the upper side part 13 and the vertical side upper part 14.

In the case of the synthetic rubber, it is vulcanized and foamed by heating the molding die 50 after being injected into the molding die 50. On this occasion, the extrusion molding part and the die molding part are firmly bonded in one body because they can be subjected to vulcanization bonding using the same materials or equivalent materials. In the case of the thermoplastic elastomer or the soft synthetic resin, since an injected material is molten when it is injected into the molding die 50, the extrusion molding part and the die molding part are integrally fused by heat or pressure generated at that time.

Next, work of extracting the corner part 12 molded from the cavity 55 of the molding die 50 is performed. First, the upper die 51 of the molding die 50 is moved upward while being shifted in a right direction in FIG. 10. The cores for forming the hollow seal part 30 at the middle portion of the corner part 12 are attached to the upper die 51. The cores can be extracted from the core removal slits 35.

Next, the central core 53 is moved in a direction in which it is separated from the lower die 52, and thereby a core 52a can be extracted from the core removal slits 35. Then, the door weather strip 10 is held by the central core 53. Afterwards, the door weather strip 10 is removed from the central core 53, and the molding is completed.

What is claimed is:

1. A door weather strip for a vehicle which is configured to be attached to an outer circumference of a door of the vehicle and to seal a space between a vehicle body opening and the door of the vehicle, the door weather strip comprising:
    an extrusion molding part; and
    a die molding part that connects ends of the extrusion molding part to each other, wherein:
    each of the extrusion molding part and the die molding part has an attaching base, which is configured to be attached to the outer circumference of the door, a hollow seal part that is integrally formed at the attaching base and is configured to contact and form a seal with a periphery of the vehicle body opening, and a seal lip part that is integrally formed at the hollow seal part or the attaching base and is configured to contact the periphery of the vehicle body opening;
    the attaching base has a bottom side part having a plate-like shape and is configured to face the outer circumference of the door;
    core removal slits of the hollow seal part, which reach a hollow part of the hollow seal part, are formed at a main wall of the seal lip part of the die molding part;
    two core removal slits of the attaching base, which reach the hollow part of the hollow seal part, are provided at the bottom side part of the attaching base of the die molding part and are provided such that the core removal slits of the attaching base are located at opposite sides of the core removal slits of the hollow seal part; and
    one of the core removal slits of the hollow seal part is open in a direction parallel to the bottom side part of the attaching base, and the other of the core removal slits of the attaching base is open in a direction perpendicular to the bottom side part of the attaching base.

2. The door weather strip according to claim 1, further comprising a plurality of biasing ribs of the hollow seal part, running from a vicinity of a tip of the main wall of the seal lip part of the core removal slits of the hollow seal part in a direction of the bottom side part of the attaching base.

3. The door weather strip according to claim 2, wherein an interval between the biasing ribs of the hollow seal part ranges from 2 mm to 7 mm.

4. The door weather strip according to claim 2, wherein the biasing ribs of the hollow seal part are formed to be in contact with an upper surface of the bottom side part of the attaching base, and are in contact with an upper surface of a vehicle inside relative to a lateral end of a vehicle outside of the upper surface of the bottom side part of the attaching base.

5. The door weather strip according to claim 1, further comprising a water cutoff wall of hollow seal part, located between the core removal slits of the hollow seal part and hollow part of the hollow seal part which is opened and between the core removal slits of the attaching base and the hollow part of the hollow seal part which is opened.

6. The door weather strip according to claim 1, further comprising seal projections of the attaching base, continued in a longitudinal direction and located at opposite ends of an outer surface of the bottom side part of the attaching base.

7. The door weather strip according to claim 1, wherein each of the two core removal slits of the attaching base is elongated and extends in a longitudinal direction of the hollow seal part of the die molding part.

8. The door weather strip according to claim 7, wherein the two core removal slits of the attaching base are configured to permit molding cores, which are used to form the hollow seal part of the die molding part, to be extracted from within the hollow seal part of the die molding part.

9. A door weather strip for a vehicle which is configured to be attached to an outer circumference of a door of the vehicle to seal a space between a vehicle body opening and the door of the vehicle, the door weather strip comprising:
an extrusion molding part; and
a die molding part that connects ends of the extrusion molding part to each other, wherein:
each of the extrusion molding part and the die molding part has an attaching base, which is configured to contact and be attached to the outer circumference of the door, a hollow seal part that is integrally formed at the attaching base and is configured to contact and form a seal with a periphery of the vehicle body opening, and a seal lip part that is integrally formed at the hollow seal part or the attaching base and is configured to contact the periphery of the vehicle body opening;
the attaching base has a bottom side part having a plate-like shape that is configured to face the outer circumference of the door;
core removal slits formed in the hollow seal part, which reach a hollow part of the hollow seal part, are formed at a main wall of the seal lip part of the die molding part;
two core removal slits of the attaching base, which reach the hollow part of the hollow seal part, are provided at the bottom side part of the attaching base of the die molding part,
the two core removal slits of the attaching base are configured to permit molding cores, which are used to form the hollow seal part of the die molding part, to be extracted from within the hollow seal part of the die molding part;
the core removal slits of the hollow seal part are located between the core removal slits of the attaching base in the longitudinal direction of the attaching base, and
an outer opening of one of the core removal slits of the hollow seal part faces a direction parallel to the bottom side part of the attaching base, and outer openings of the core removal slits of the attaching base face a direction perpendicular to the bottom side part of the attaching base.

10. The door weather strip according to claim 9, further comprising a plurality of biasing ribs of the hollow seal part, wherein the biasing ribs extend from a vicinity of a tip of the main wall of the seal lip part of the core removal slits of the attaching base and toward the bottom side part of the attaching base.

11. The door weather strip according to claim 10, wherein an interval between the biasing ribs of the hollow seal part ranges from 2 mm to 7 mm.

12. The door weather strip according to claim 10, wherein the biasing ribs of the hollow seal part are formed to be in contact with an inner surface of the bottom side part of the attaching base.

13. The door weather strip according to claim 9, further comprising a water cutoff wall of the hollow seal part, which is located between the core removal slits of the hollow seal part and hollow part of the hollow seal part that is opened and between the core removal slits of the attaching base and the hollow part of the hollow seal part that is opened.

14. The door weather strip according to claim 9, further comprising seal projections of the attaching base, which continue in a longitudinal direction and are located at opposite sides of an outer surface of the bottom side part of the attaching base.

15. The door weather strip according to claim 9, wherein each of the two core removal slits of the attaching base is elongated and extends in a longitudinal direction of the hollow seal part of the die molding part.

* * * * *